United States Patent
Chen et al.

(10) Patent No.: US 7,758,133 B2
(45) Date of Patent: Jul. 20, 2010

(54) MOUNTING ASSEMBLY FOR SIDE PANEL OF COMPUTER ENCLOSURE

(75) Inventors: Yun-Lung Chen, Tu-Cheng (TW); Li Tong, Shenzhen (CN); Quan-Guang Du, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 1051 days.

(21) Appl. No.: 11/309,115

(22) Filed: Jun. 23, 2006

(65) Prior Publication Data

US 2007/0222347 A1    Sep. 27, 2007

(30) Foreign Application Priority Data

Mar. 25, 2006    (CN) .......................... 2006 20 057177

(51) Int. Cl.
*A47B 97/00* (2006.01)
(52) U.S. Cl. .................................................. 312/223.2
(58) Field of Classification Search ............. 312/257.1, 312/223.1, 223.2, 265.6, 215; 292/137, 138, 292/140, 141, 145, 146, 149, 150; 361/679.02; 174/58, 63; 220/324, 784, 787, 788; 403/350, 403/351, 352
See application file for complete search history.

(56) References Cited

U.S. PATENT DOCUMENTS

| | | | | |
|---|---|---|---|---|
| 5,967,633 A | * | 10/1999 | Jung | 312/223.2 |
| 5,992,955 A | * | 11/1999 | Yang | 312/265.6 |
| 5,997,115 A | * | 12/1999 | Radloff et al. | 312/222 |
| 6,273,532 B1 | | 8/2001 | Chen et al. | |
| 6,382,744 B1 | | 5/2002 | Xiao | |
| 6,407,912 B1 | * | 6/2002 | Chen et al. | 361/679.58 |
| 6,457,788 B1 | * | 10/2002 | Perez et al. | 312/265.5 |
| 6,598,910 B2 | * | 7/2003 | McGregor et al. | 292/156 |
| 6,637,847 B2 | * | 10/2003 | Crisp et al. | 312/223.2 |
| 6,721,183 B1 | * | 4/2004 | Chen et al. | 361/726 |
| 6,824,174 B2 | * | 11/2004 | Lin et al. | 292/85 |
| 6,966,620 B2 | * | 11/2005 | Lai | 312/223.3 |
| 7,016,187 B2 | * | 3/2006 | Sura et al. | 361/679.58 |
| 7,061,755 B2 | * | 6/2006 | Lin et al. | 361/679.58 |
| 7,082,036 B2 | * | 7/2006 | Cheng et al. | 361/726 |
| 7,193,855 B2 | * | 3/2007 | Fan et al. | 361/724 |
| 7,252,351 B2 | * | 8/2007 | Chen et al. | 312/223.2 |
| 7,261,383 B2 | * | 8/2007 | Fan et al. | 312/223.2 |
| 7,272,011 B2 | * | 9/2007 | Chen et al. | 361/726 |
| 7,443,688 B2 | * | 10/2008 | Chen et al. | 361/726 |
| 7,486,506 B2 | * | 2/2009 | Chen et al. | 361/679.02 |
| 2005/0017608 A1 | * | 1/2005 | Lin et al. | 312/223.2 |
| 2007/0247035 A1 | * | 10/2007 | Chen et al. | 312/223.2 |

* cited by examiner

*Primary Examiner*—Darnell M Jayne
*Assistant Examiner*—Michael Calabrese
(74) *Attorney, Agent, or Firm*—Frank R. Niranjan

(57) ABSTRACT

A computer enclosure includes a chassis (10), a side panel (20), and a fastening apparatus. The chassis has an opening (11), and comprises a rear panel (12) in which a hole (123) is defined. The side panel is configured for covering the opening of the chassis. The fastening apparatus secures the side panel to the chassis. The fastening apparatus includes a resilient piece (30). One end of the resilient piece is mounted to inside of the side panel. Another end of the resilient piece defines at least a hook (341) engaging in the hole of the rear panel for clasping the rear panel. The fastening apparatus further includes a latch (40) for urging the hook of the resilient piece to disengage from the hole of the rear panel.

17 Claims, 8 Drawing Sheets

MOUNTING ASSEMBLY FOR SIDE PANEL OF COMPUTER ENCLOSURE

FIELD OF THE INVENTION

The present invention relates to mounting assemblies, and more particularly to a mounting assembly for securing a side panel on a computer enclosure.

DESCRIPTION OF RELATED ART

Many different means are used to secure side panels to computer enclosures. One conventional means is to simply screw a side panel directly to a computer enclosure. However, this requires a screwdriver. Installation and removal of the side panel is unduly cumbersome and time-consuming.

As computers have proliferated and improved, various fastening means have been developed to facilitate installation and removal of side panels. One conventional fastening assembly includes a computer frame and a pair of side panels secured to the frame. The frame includes a bottom panel, a top panel, a front panel, and a rear panel. The front and rear panels are engaged between the top panel and the bottom panel. A pair of first flanges extends from opposite edges of the bottom panel. A pair of second flanges depends from opposite edges of the top panel. Each first flange defines a plurality of rectangular slots therein. Each second flange defines a plurality of second slots therein. A pair of hems is formed at top and bottom edges of each side panel. Each hem forms a plurality of hooks for engaging with the slots of the flanges. At least one through hole is defined in each hem for receiving at least one screw to secure the side panels to the frame. Because screws are needed to fix the side panel to the frame, installation and removal of the side panels is still unduly cumbersome and time-consuming.

What is needed, therefore, is a mounting assembly for a computer enclosure allowing convenient attachment and removal of a side panel of a chassis.

SUMMARY OF INVENTION

A computer enclosure includes a chassis, a side panel, and a fastening apparatus. The chassis has an opening, and comprises a rear panel in which a hole is defined. The side panel is configured for covering the opening of the chassis. The fastening apparatus is capable of securing the side panel to the chassis. The fastening apparatus includes a resilient piece. One end of the resilient piece is mounted to an inside of the side panel. Another end of the resilient piece defines at least a hook engaging in the hole of the rear panel for clasping the rear panel. The fastening apparatus further includes a latch for urging the hook of the resilient piece to disengage from the hole of the rear panel.

Other advantages and novel features will be drawn from the following detailed description of a preferred embodiment with attached drawings, in which:

DETAILED DESCRIPTION

Figure 1:
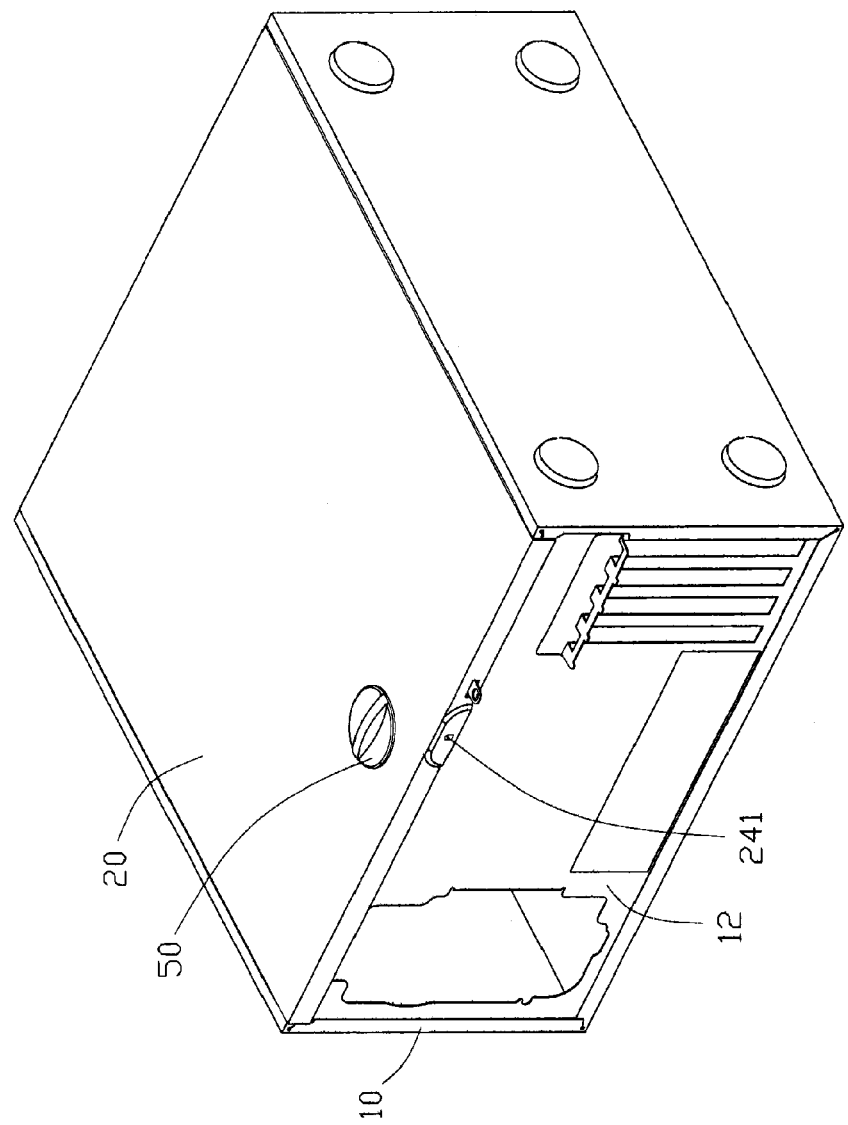
FIG. 1 is an assembled, isometric view of a computer enclosure of a preferred embodiment of the present invention, showing a chassis, a side panel, and a knob.
Figure 2:
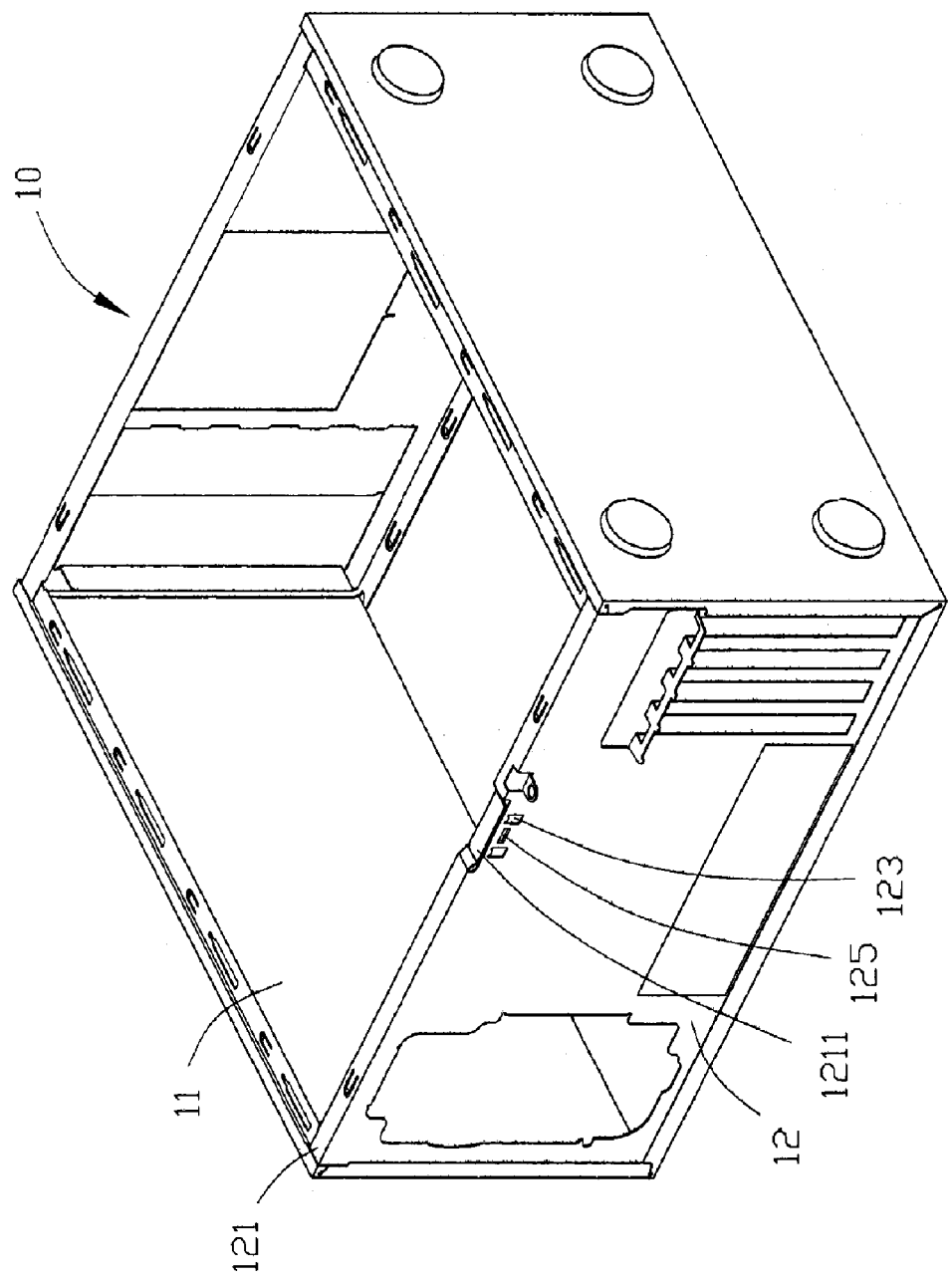
FIG. 2 is an isometric view of the chassis of FIG. 1.
Figure 3:
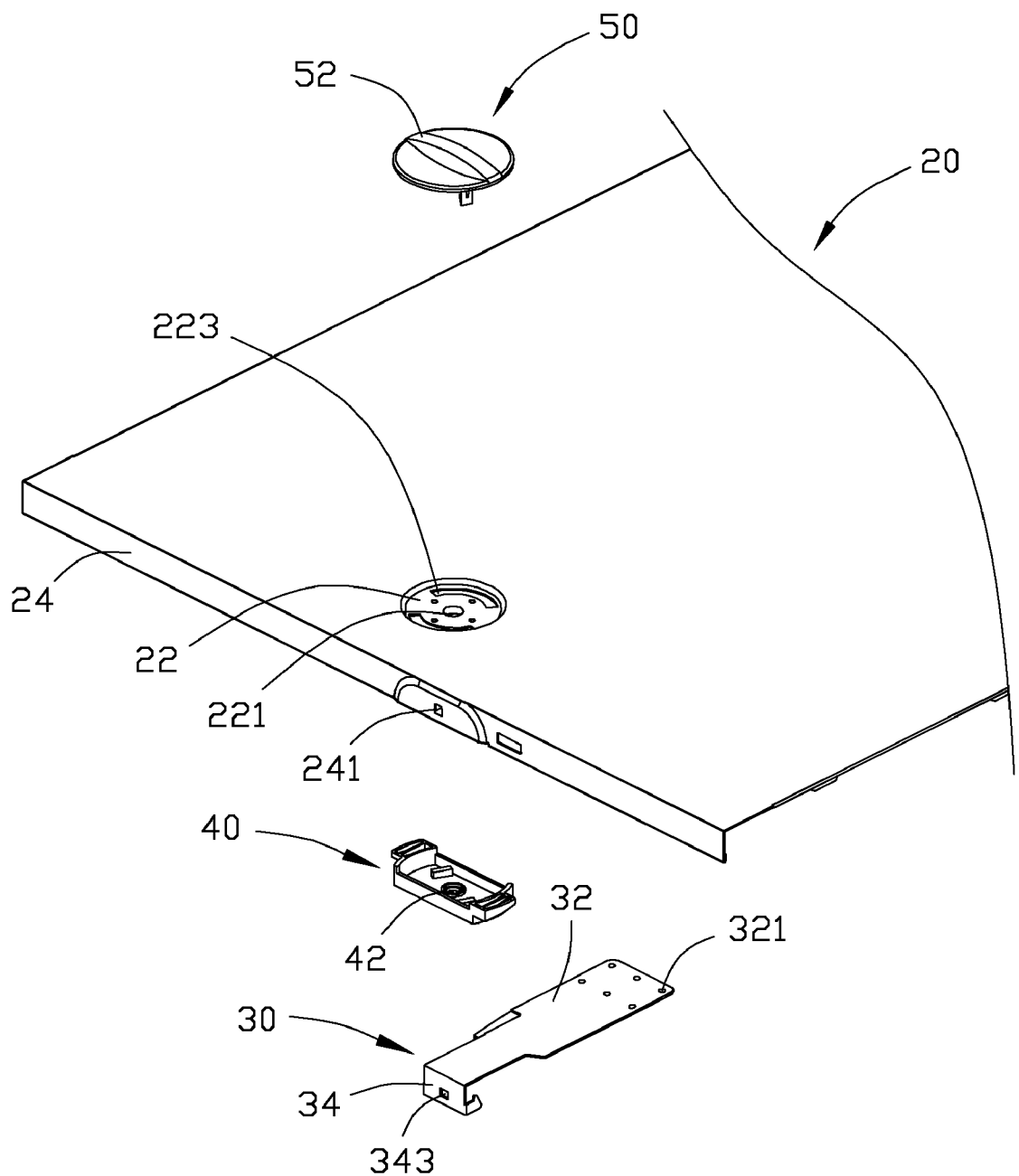
FIG. 3 is an exploded and partial view of FIG. 1, showing the side panel, a resilient piece, a latch, and the knob.

Referring to FIG. 1 to FIG. 3, a computer enclosure includes a chassis 10 with an opening 11, a side panel 20 for covering the opening 11, a resilient piece 30, a latch 40, and a knob 50.

The chassis 10 includes a rear panel 12. A flange 121 extends perpendicularly from an edge of the rear panel 12 for supporting the side panel 20. The flange 121 forms a recessed portion 1211. The rear panel 12 defines a pair of rectangular holes 123 below the recessed portion 1211. A securing tab 1231 (shown in FIG. 8) protrudes from an edge of each rectangular hole 123 adjacent the recessed portion 1211. An aligning hole 125 is defined in the rear panel 12 between the rectangular holes 123.

The side panel 20 defines a circular recessed fixing portion 22. The fixing portion 22 defines a circular pivot hole 221 in a center thereof and a pair of arc-shaped sliding slots 223. A flange 24 extends from an edge near the fixing portion 22 of the side panel 20. The flange 24 defines an aligning hole 241 corresponding to the aligning hole 125 of the chassis 10.

Figure 4:
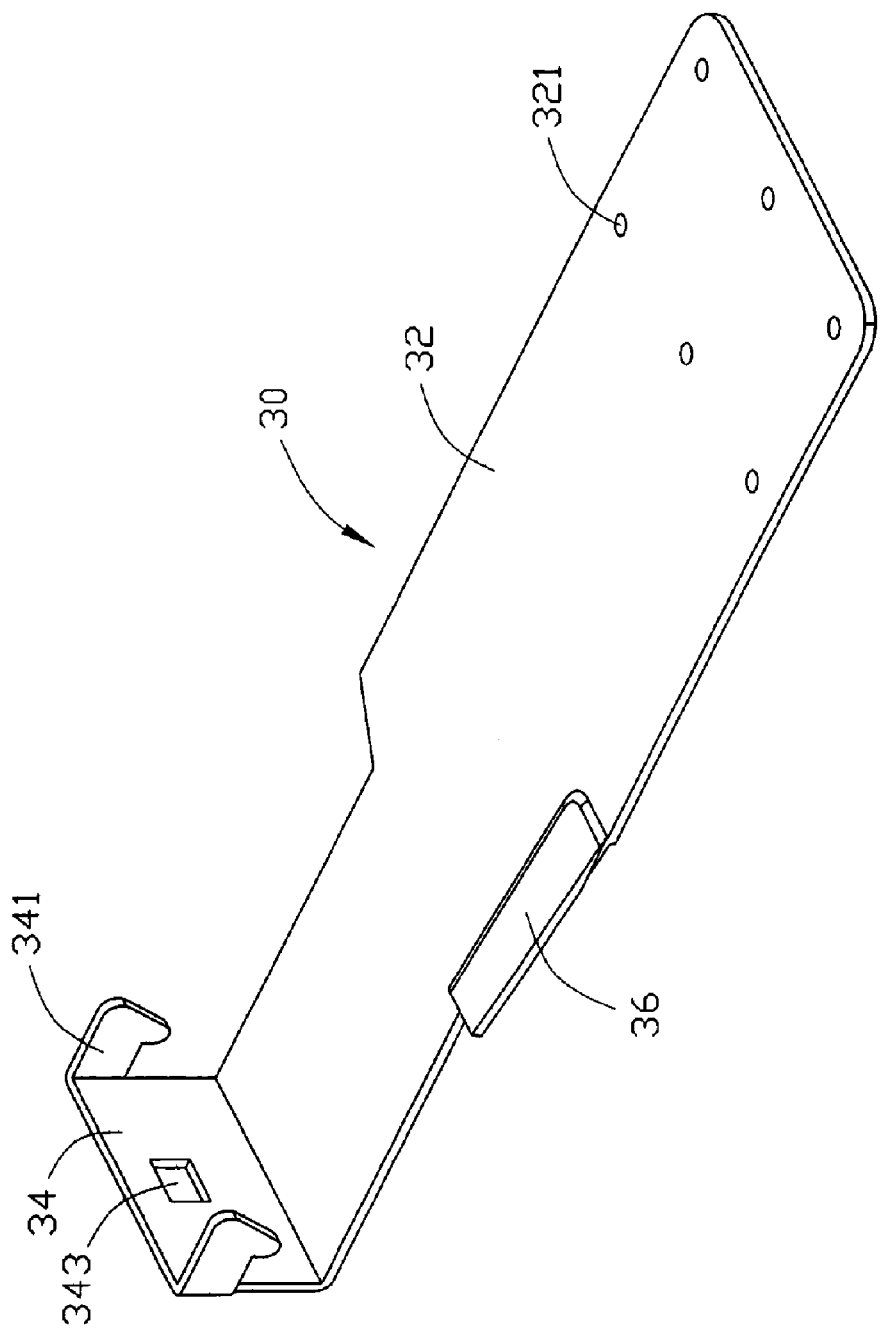
FIG. 4 is an enlarged isometric view of the resilient piece of FIG. 3, but viewed from another aspect.

Referring to FIG. 3 and FIG. 4, the resilient piece 30 includes a body 32 and a bent portion 34. The body 32 includes a first/free end and a second/fixed end. The bent portion 34 extends perpendicularly from the first/free end of the body 32. A pair of hooks 341 extends from two distal corners of the bent portion 34 for inserting in the rectangular holes 123 of the rear panel 12 respectively. The bent portion 34 defines an aligning hole 343 corresponding to the aligning holes 125, 241. A plurality of fastening holes 321 is defined in the second/fixed end of the body 32. A sloped portion 36 extends from an edge of the body 32.

Figure 5:
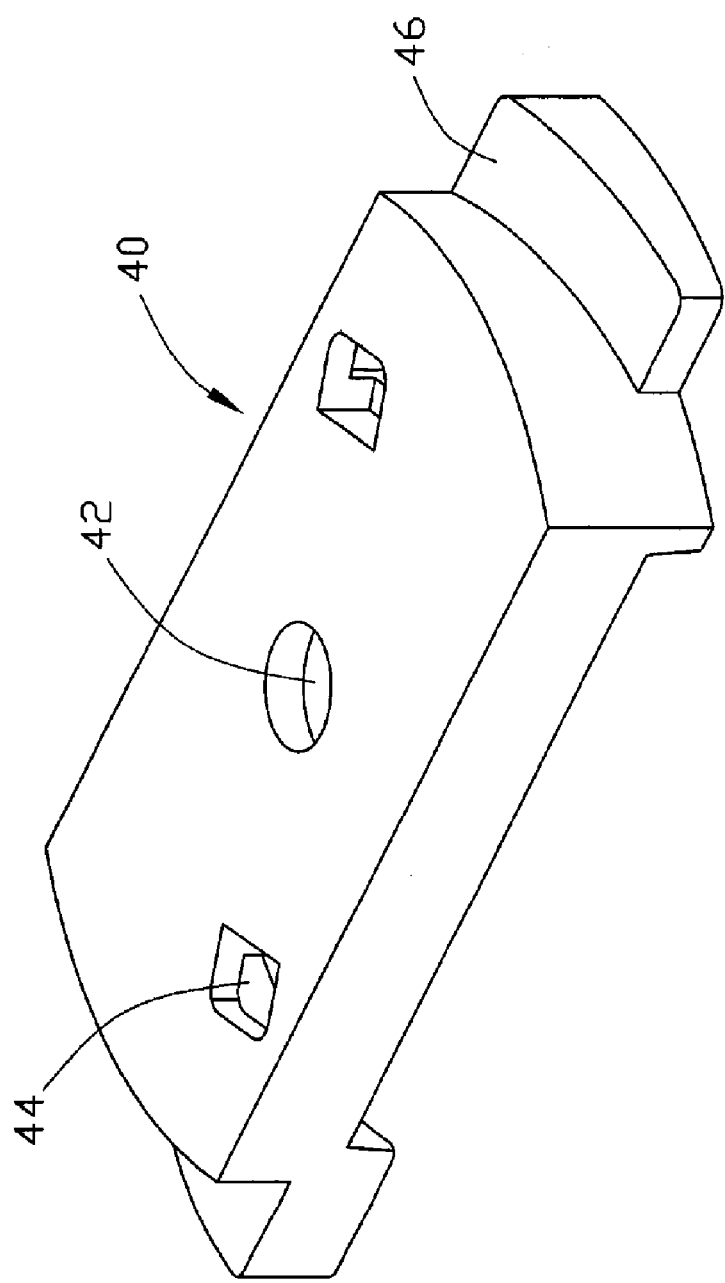
FIG. 5 is an enlarged view of the latch of FIG. 3, but viewed from another aspect.

Referring to FIG. 3 and FIG. 5, a circular pivot hole 42 is defined in the center of the latch 40, corresponding to the pivot hole 221 of the side panel 20. A pair of aligning holes 44 is defined in the latch 40 centrosymmetric to the pivot hole 42. Two wedge-shaped blocks 46 are formed at opposite ends of the latch 40. Each block 46 has an inclined surface corresponding to the sloped portion 36 of the resilient piece 30. The inclined surfaces of the blocks 46 are also centrosymmetric to the pivot hole 42.

Figure 6:
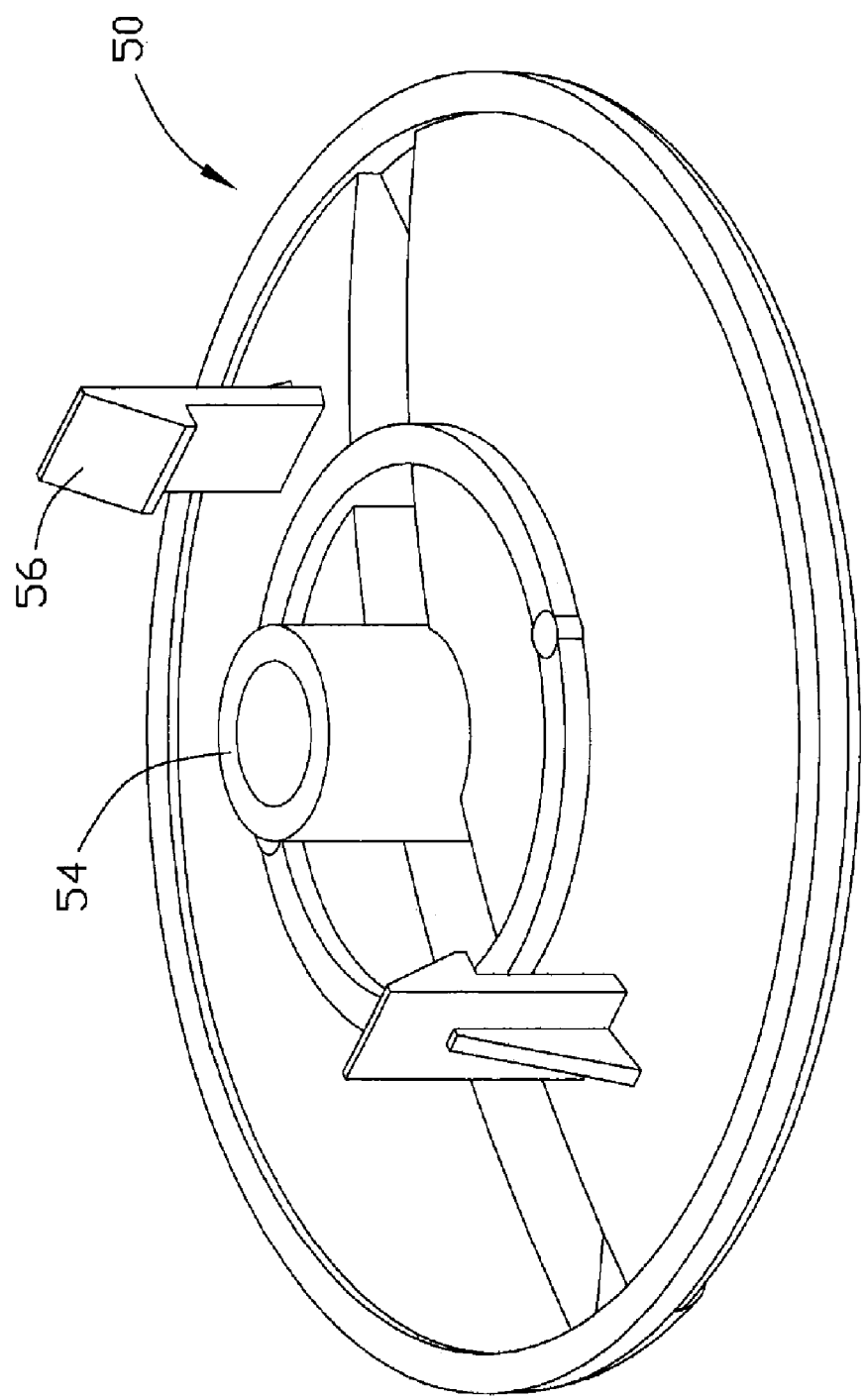
FIG. 6 is an enlarged view of the knob of FIG. 3, but viewed from another aspect.

Referring to FIG. 3 and FIG. 6, a grip 52 is formed on an outside of the knob 50. A circular pivot post 54 protrudes from an inside of the knob 50 corresponding to the pivot holes 221 and 42. A pair of hooks 56 is formed the inside of the knob 50 corresponding to the aligning holes 44 of the latch 40. The hooks 56 are centrosymmetric to the circular pivot post 54.

Figure 7:
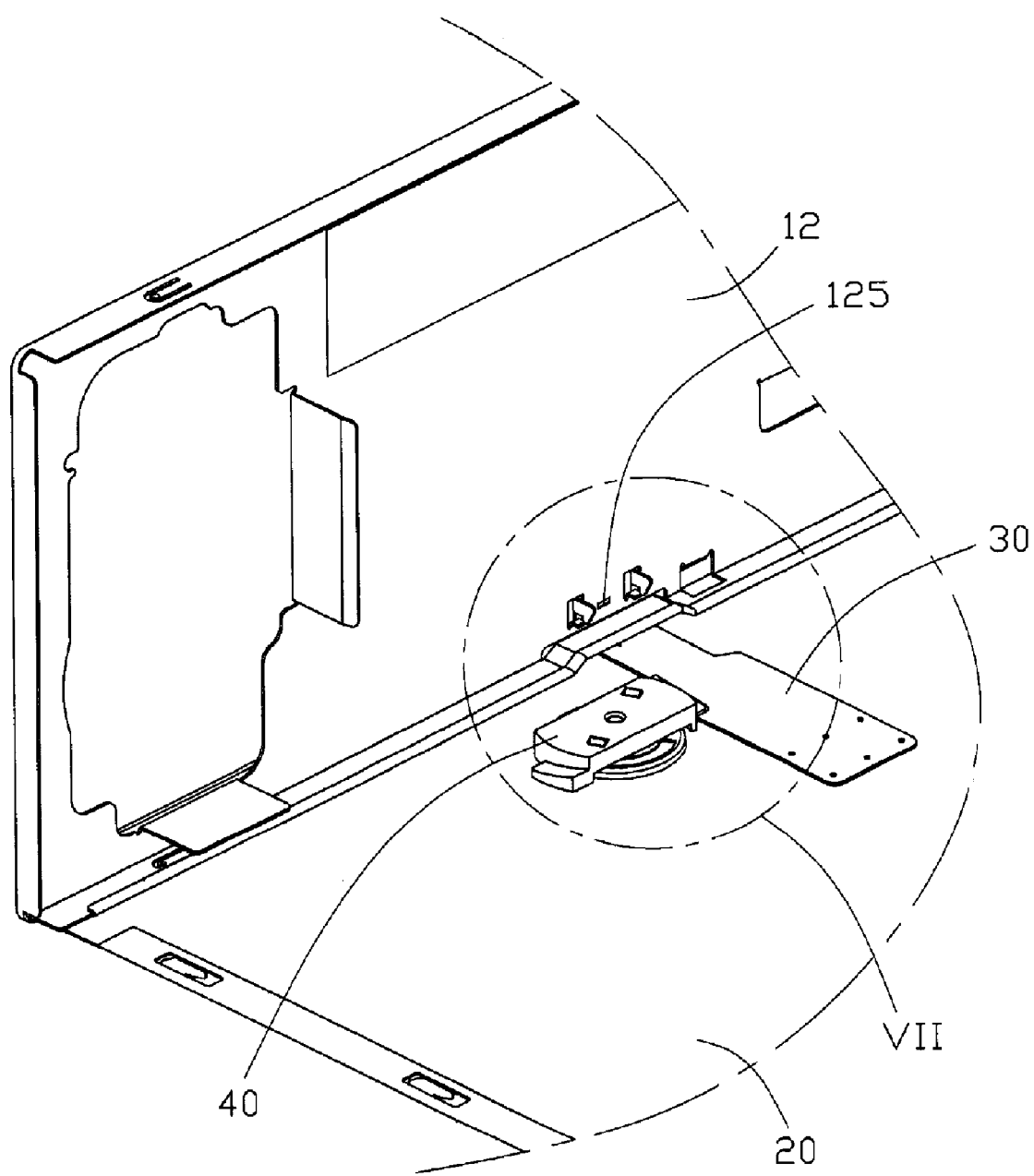
FIG. 7 is a partial, cutaway view of the computer enclosure, showing the side panel in an unlocked position.
Figure 8:
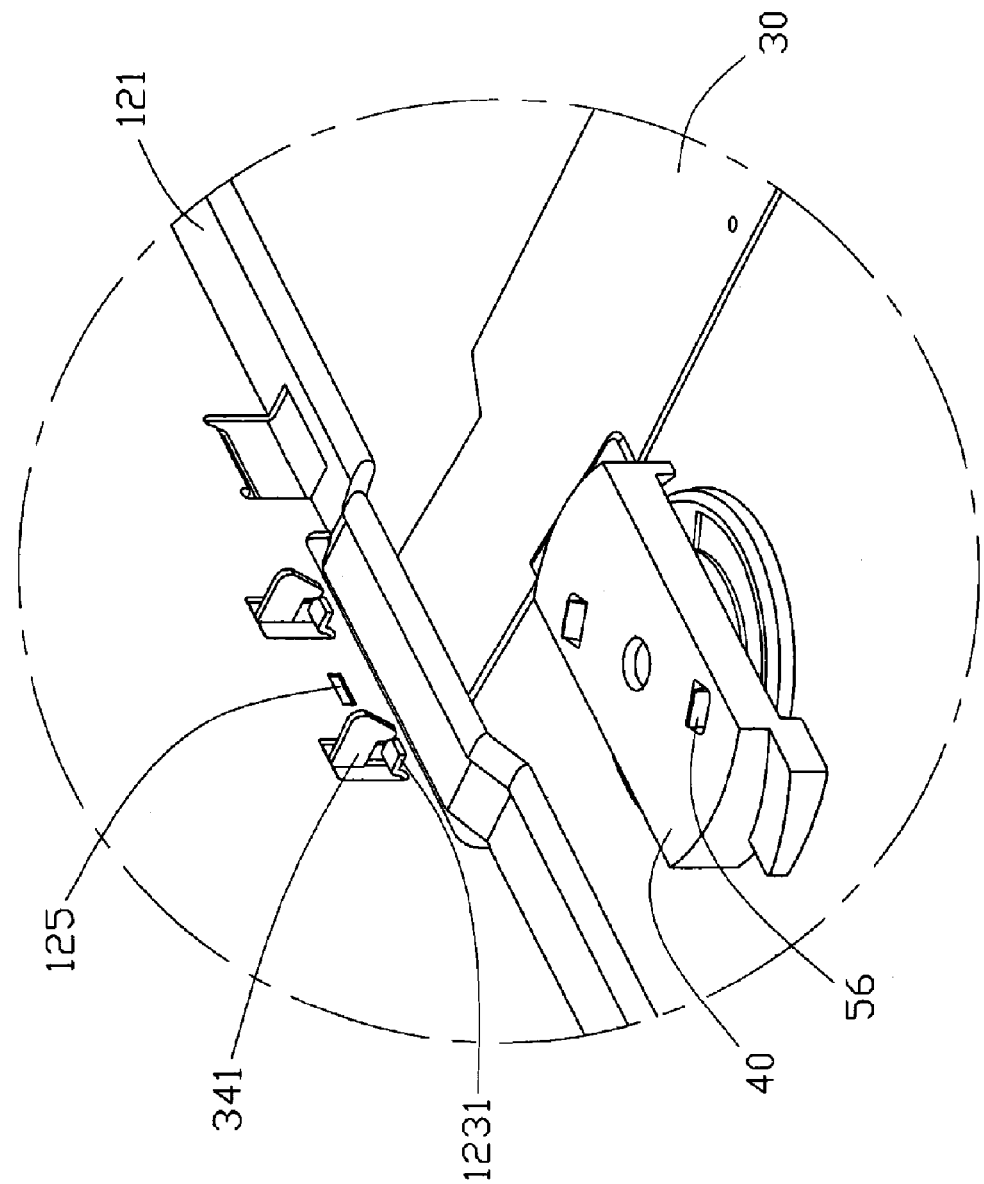
FIG. 8 is an enlarged view of circled portion VII of FIG. 7.

Referring also to FIG. 7 and FIG. 8, before assembly of the side panel 20, the pivot post 54 of the knob 50 is inserted in the pivot hole 221 of the side panel 20 from an outside of the side panel 20, and a distal end of the pivot post 54 extends through the pivot hole 221. The hooks 56 of the knob 50 are inserted in the sliding slots 223 of the side panel 20 respectively, and distal ends of the hooks 56 extend through the sliding slots 223. The latch 40 is then installed on an inner surface of the side panel 20. The distal end of the pivot post 54 of the knob 50 is inserted into the pivot hole 42 of the latch 40, and the hooks 56 are engaged into the aligning holes 44 and are rotatable in the corresponding sliding slots 223 of the side panel 20. The knob 50 and the latch 40 are thus assembled on the side panel 20. When the knob 50 is rotated from outside of the side panel 20, the latch 40 is consequently rotated about the pivot post 54. A plurality of fasteners (not shown), such as rivets, extend through the fastening holes 321 to engage with the side panel 20 while the aligning hole 343 of the resilient piece 30 aligns with the aligning hole 241 of the flange 24, thereby fixing the resilient piece 30 on the inner surface of the side panel 20 at the fixed end thereof.

In assembling the side panel 20, the side panel 20 is placed on the chassis 10 to cover the opening 11 of the chassis 10. The first/free end of resilient piece 30 is positioned between the recessed portion 1211 of the rear panel 12 and the side panel 20. The side panel 20 is then pushed to slide on the chassis 10 forwardly. Due to resilient deformation of the first/free end of the resilient piece 30, the hooks 341 of the resilient piece 30 are inserted into the rectangular holes 123 of the rear panel 12 of the chassis 10, and engage with the securing tabs 1231 when the resilient piece 30 rebounds to an original state. The side panel 20 is thus secured to the chassis 10 and located at a locked state, and the aligning hole 125 aligns with the aligning holes 241,343. A fastener can extend through the aligning holes 125, 241, 343 for further securing the side panel 20 if necessary. At the locked state, the blocks 46 of the latch 40 are located away from the sloped portion 36 of the resilient piece 30. In above process, the latch 40 is away from the resilient piece 30.

In removing the side panel 20 from the chassis 10, the latch 40 and the knob 50 are rotated until one of the blocks 46 is inserted between the sloped portion 36 of the resilient piece 30 and the side panel 20. The block 46 pushes the sloped portion 36 of the resilient piece 30 to move in a direction away from the side panel 20 to deform the first/free end of the resilient piece 30. When the hooks 341 of the resilient piece 30 disengage from the securing tabs 1231 of the rear panel 12, as shown in FIG. 8, the side panel 20 can be thus pulled to slide on the chassis 10 backwardly, and the hooks 341 are removed away from the rectangular holes 123. Thus, the side panel 20 can be taken away from the chassis 10.

It is to be understood, however, that even though numerous characteristics and advantages have been set forth in the foregoing description of a preferred embodiment, together with details of the structure and function of the preferred embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A computer enclosure comprising:
   a chassis having an opening, the chassis comprising a rear panel in which a hole is defined;
   a side panel for covering the opening of the chassis; and
   a fastening apparatus for securing the side panel to the chassis, the fastening apparatus comprising a resilient piece, one end of the resilient piece being mounted to an inside of the side panel, another end of the resilient piece having at least a hook engaging in the hole of the rear panel for clasping the rear panel, the fastening apparatus further comprising a latch for urging the hook of the resilient piece to disengage from the hole of the rear panel;
   wherein the resilient piece comprises a body abutting against the inside of the side panel and a bent portion bent from a distal end of the body and abutting against an outside surface of the rear panel, and the hook extends from a distal end of the bent portion and extends into an accommodating space in the chassis to engage with the hole; and the resilient piece further comprises a sloped portion extending from the body, the latch comprises a block insertable between the sloped portion and the side panel to deform the resilient piece.

2. The computer enclosure as described in claim 1, wherein the block has a wedge shape with an inclined surface corresponding to the sloped portion of the resilient piece.

3. The computer enclosure as described in claim 1, wherein a recessed portion is formed on the rear panel of the chassis to provide space for said another end of the resilient piece from which the at least a hook is formed.

4. The computer enclosure as described in claim 1, wherein a securing tab is formed at an edge of the hole near to the side panel for engaging with the hook of the resilient piece.

5. The computer enclosure as described in claim 1, wherein the fastening apparatus further comprises a knob installed on an outside of the side panel for driving the latch.

6. The computer enclosure as described in claim 5, wherein at least a knob hook is formed on an inside of the knob, and at least a fastening hole is defined in the latch corresponding to the at least a knob hook.

7. The computer enclosure as described in claim 6, wherein at least an arc-shaped sliding slot to receive the knob hook is defined in the side panel.

8. A mounting assembly, comprising:
   a chassis having an opening, the chassis comprising a rear panel in which a securing hole is defined;
   a side panel for covering the opening of the chassis;
   a resilient piece attached to the side panel, a hook bent from an end of the resilient piece for engaging into the securing hole of the chassis; and
   a latch pivotably installed on the side panel about an axis that is perpendicular to the side panel, and capable of deforming the resilient piece for urging the hook to disengage from the securing hole of the rear panel.

9. The mounting assembly as described in claim 8, wherein the resilient piece comprises a body that abuts on an inside surface of the side panel and a bent portion bent perpendicularly from the body, the hook extends from the distal end of the bent portion.

10. The mounting assembly as described in claim 9, wherein the resilient piece further comprises a sloped portion extending from the body, the latch comprises a block insertable between the sloped portion and the side panel to press the resilient piece for urging the hook to disengage from the hole of the rear panel.

11. The mounting assembly as described in claim 10, wherein the block has an inclined surface corresponding to the sloped portion of the resilient piece.

12. The mounting assembly as described in claim 10, wherein a knob for driving the latch is rotatably installed on an outside of the side panel.

13. The mounting assembly as described in claim 12, wherein a pivot hole is defined in the side panel, and an additional pivot hole is defined in the latch corresponding to the pivot hole of the side panel, a pivot post for inserting in the pivot hole of the side panel and the pivot hole of the latch is defined on an inside of the knob.

14. The mounting assembly as described in claim 13, wherein at least a knob hook is defined on the inside of the knob beside the pivot post, at least a fastening hole corresponding to the knob hook is defined in the latch, at least an arc-shaped sliding slot is defined in the side panel, the at least a knob hook extending through the at least sliding slot to engage in the at least a fastening hole.

15. The mounting assembly as described in claim 8, wherein a recessed portion is formed on the rear panel of the chassis to provide space for said one end of the resilient piece from which the hook is formed.

16. A computer enclosure comprising:
- a chassis comprising an opening and a rear panel;
- a side panel configured for covering the opening of the chassis;
- a resilient piece comprising a fixed end securely attached to the side panel, and a free end;
- an interlocking structure being formed between the free end of the resilient piece and the rear panel and configured for interlocking the side panel with the rear panel; and
- a latch moveably attached on the side panel, and capable of deforming the free end of the resilient piece to urge the interlocking structure to disengage the connection of the side panel to the rear panel;
- wherein the resilient piece comprises a portion spaced from the side panel and located near the free end, the latch comprises of a block that is insertable between said portion and the side panel and capable of pushing the free end of the resilient piece away from the side panel to disengage the connection of the side panel to the rear panel, at least one of the portion and the block have a sloped surface.

17. The computer enclosure of claim 16, wherein the interlocking structure comprises a securing hole defined at the rear panel and a hook formed at the free end.

* * * * *